(12) United States Patent
Victorian et al.

(10) Patent No.: US 9,036,833 B2
(45) Date of Patent: *May 19, 2015

(54) EXTERNAL EAR CANAL VOICE DETECTION

(75) Inventors: Thomas A. Victorian, Plymouth, MN (US); David A. Preves, Bradenton, FL (US); J. Virgil Bradley, Plymouth, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 406 days.

This patent is subject to a terminal disclaimer.

(21) Appl. No.: 13/088,902

(22) Filed: Apr. 18, 2011

(65) Prior Publication Data

US 2011/0195676 A1    Aug. 11, 2011

Related U.S. Application Data

(60) Continuation of application No. 12/163,665, filed on Jun. 27, 2008, now Pat. No. 7,929,713, which is a division of application No. 10/660,454, filed on Sep. 11, 2003, now abandoned.

(51) Int. Cl.
*H04R 3/00* (2006.01)
*H04R 25/00* (2006.01)
*H04R 5/033* (2006.01)

(52) U.S. Cl.
CPC .............. *H04R 25/554* (2013.01); *H04R 5/033* (2013.01); *H04R 2460/03* (2013.01)

(58) Field of Classification Search
CPC ................. H04R 2420/07; H04R 2201/107; H04R 5/033; H04R 1/44; H04R 2217/03; H04R 2430/23; H04R 2460/03; H04R 2460/13; H04R 2499/11; H04R 25/554; H04R 3/00; H04R 3/005

USPC ................. 381/328, 330, 322, 93; 455/412.1, 455/412.2, 550.1, 556.2, 79; 707/205
See application file for complete search history.

(56) References Cited

U.S. PATENT DOCUMENTS

| 4,791,672 A | 12/1988 | Nunley et al. | |
|---|---|---|---|
| 5,008,954 A * | 4/1991 | Oppendahl | 455/79 |

(Continued)

FOREIGN PATENT DOCUMENTS

| WO | WO-9845937 A1 | 10/1998 |
|---|---|---|
| WO | WO-0207477 A2 | 1/2002 |

(Continued)

OTHER PUBLICATIONS

"U.S. Appl. No. 10/660,454, Advisory Action mailed May 20, 2008", 4 pgs.

(Continued)

*Primary Examiner* — Lun-See Lao
(74) *Attorney, Agent, or Firm* — Schwegman Lundberg & Woessner, P.A.

(57) ABSTRACT

Ear-level full duplex audio communication systems each include one or two ear attachment devices, such as in-the-ear (ITE) or behind-the-ear (BTE) devices, that wirelessly communicates to a remote device such as a computer, a personal digital assistant (PDA), a cellular phone, a walkie talkie, or a language translator. When used as a hearing aid, such a system allows a hearing impaired individual to communicate with or through the remote device, such as to talk to another person through a cellular phone. When being used as an ear piece wirelessly extended from the remote device, such system allows an individual with normal hearing to privately communicate with or through the remote device without the need of holding the device or wearing any device wired to the remote device. Each ear attachment device includes a voice operated exchange (VOX), housed within the device, to preserve energy and hence, maximize the period between battery replacement or recharges. The VOX also gates various sounds detected by the system to control possible echoes and ringing.

20 Claims, 9 Drawing Sheets

(56) References Cited

U.S. PATENT DOCUMENTS

| | | | |
|---|---|---|---|
| 5,208,867 | A | 5/1993 | Stites, III |
| 5,327,506 | A | 7/1994 | Stites, III |
| 5,426,719 | A | 6/1995 | Franks et al. |
| 5,550,923 | A | 8/1996 | Hotvet |
| 5,553,152 | A | 9/1996 | Newton |
| 5,659,621 | A | 8/1997 | Newton |
| 5,701,348 | A | 12/1997 | Shennib et al. |
| 5,721,783 | A * | 2/1998 | Anderson ............... 381/328 |
| 5,761,319 | A | 6/1998 | Dar et al. |
| 5,917,921 | A | 6/1999 | Sasaki et al. |
| 5,991,419 | A | 11/1999 | Brander |
| 6,175,633 | B1 * | 1/2001 | Morrill et al. ........... 381/71.6 |
| 6,661,901 | B1 | 12/2003 | Svean et al. |
| 6,671,379 | B2 | 12/2003 | Nemirovski |
| 6,718,043 | B1 * | 4/2004 | Boesen ................... 381/314 |
| 6,728,385 | B2 * | 4/2004 | Kvaløy et al. ........... 381/328 |
| 6,738,482 | B1 | 5/2004 | Jaber |
| 6,738,485 | B1 * | 5/2004 | Boesen ................... 381/312 |
| 6,801,629 | B2 | 10/2004 | Brimhall et al. |
| 7,027,603 | B2 | 4/2006 | Taenzer |
| 7,027,607 | B2 | 4/2006 | Pedersen et al. |
| 7,072,476 | B2 * | 7/2006 | White et al. ............. 381/74 |
| 7,110,562 | B1 | 9/2006 | Feeley et al. |
| 7,242,924 | B2 | 7/2007 | Xie |
| 7,477,754 | B2 | 1/2009 | Rasmussen et al. |
| 7,929,713 | B2 * | 4/2011 | Victorian et al. ........ 381/110 |
| 7,983,907 | B2 | 7/2011 | Visser et al. |
| 8,031,881 | B2 | 10/2011 | Zhang |
| 8,059,847 | B2 | 11/2011 | Nordahn |
| 8,081,780 | B2 | 12/2011 | Goldstein et al. |
| 8,111,849 | B2 | 2/2012 | Tateno et al. |
| 8,116,489 | B2 | 2/2012 | Mejia et al. |
| 8,130,991 | B2 | 3/2012 | Rasmussen et al. |
| 8,391,522 | B2 | 3/2013 | Biundo Lotito et al. |
| 8,391,523 | B2 | 3/2013 | Biundo Lotito et al. |
| 8,477,973 | B2 | 7/2013 | Merks |
| 2001/0038699 | A1 | 11/2001 | Hou |
| 2002/0034310 | A1 | 3/2002 | Hou |
| 2002/0080979 | A1 | 6/2002 | Brimhall et al. |
| 2002/0141602 | A1 | 10/2002 | Nemirovski |
| 2003/0012391 | A1 | 1/2003 | Armstrong et al. |
| 2003/0165246 | A1 | 9/2003 | Kvaloy et al. |
| 2004/0081327 | A1 | 4/2004 | Jensen |
| 2005/0058313 | A1 | 3/2005 | Victorian et al. |
| 2007/0009122 | A1 | 1/2007 | Hamacher |
| 2007/0195968 | A1 | 8/2007 | Jaber |
| 2008/0192971 | A1 | 8/2008 | Tateno et al. |
| 2008/0260191 | A1 | 10/2008 | Victorian et al. |
| 2009/0016542 | A1 | 1/2009 | Goldstein et al. |
| 2009/0034765 | A1 | 2/2009 | Boillot et al. |
| 2009/0074201 | A1 | 3/2009 | Zhang |
| 2009/0097681 | A1 | 4/2009 | Puria et al. |
| 2009/0147966 | A1 | 6/2009 | McIntosh et al. |
| 2009/0220096 | A1 | 9/2009 | Usher et al. |
| 2009/0238387 | A1 | 9/2009 | Arndt et al. |
| 2010/0061564 | A1 | 3/2010 | Clemow et al. |
| 2010/0246845 | A1 | 9/2010 | Burge et al. |
| 2010/0260364 | A1 | 10/2010 | Merks |
| 2011/0299692 | A1 | 12/2011 | Rung et al. |
| 2012/0070024 | A1 | 3/2012 | Anderson |
| 2013/0195296 | A1 | 8/2013 | Merks |
| 2014/0010397 | A1 | 1/2014 | Merks |

FOREIGN PATENT DOCUMENTS

| | | |
|---|---|---|
| WO | WO-2006028587 A2 | 3/2003 |
| WO | WO-03073790 A1 | 9/2003 |
| WO | WO-2004021740 A1 | 3/2004 |
| WO | WO-2004077090 A1 | 9/2004 |
| WO | WO-2005004534 A1 | 1/2005 |
| WO | WO-2005125269 A1 | 12/2005 |
| WO | WO-2009034536 A2 | 3/2009 |

OTHER PUBLICATIONS

"U.S. Appl. No. 10/660,454, Final Office Action mailed Dec. 27, 2007", 18 pgs.

"U.S. Appl. No. 10/660,454, Non Final Office Action mailed Jul. 27, 2007", 16 pgs.

"U.S. Appl. No. 10/660,454, Response filed Apr. 25, 2008 to Final Office Action mailed Dec. 27, 2007", 15 pgs.

"U.S. Appl. No. 10/660,454, Response filed May 9, 2007 to Restriction Requirement Apr. 9, 2007", 11 pgs.

"U.S. Appl. No. 10/660,454, Response filed Oct. 15, 2007 to Non-Final Office Action mailed Jul. 27, 2007", 17 pgs.

"U.S. Appl. No. 10/660,454, Restriction Requirement mailed Apr. 9, 2007", 5 pgs.

"U.S. Appl. No. 12/163,665, Notice of Allowance mailed Feb. 7, 2011", 4 pgs.

"U.S. Appl. No. 12/163,665, Notice of Allowance mailed Sep. 28, 2010", 9 pgs.

"Canadian Application Serial No. 2,481,397, Non-Final Office Action mailed Dec. 5, 2007", 6 pgs.

"Canadian Application Serial No. 2,481,397, Response filed Jun. 5, 2008 to Office Action mailed Dec. 5, 2007", 15 pgs.

"European Application Serial No. 04255520.1, European Search Report mailed Nov. 6, 2006", 3 pgs.

"European Application Serial No. 04255520.1, Office Action mailed Jun. 25, 2007", 4 pgs.

"European Application Serial No. 04255520.1, Response filed Jan. 7, 2008", 21 pgs.

"European Application Serial No. 10250710.0, Search Report mailed Jul. 20, 2010", 6 Pgs.

"European Application Serial No. 10250710.0, Search Report Response Apr. 18, 2011", 16 pg.

"The New Jawbone: The Best Bluetooth Headset Just Got Better", www.aliph.com, (2008), 3 pages.

Evjen, Peder M., "Low-Power Transceiver Targets Wireless Headsets", Microwaves & RF, (Oct. 2002), 68, 70, 72-73, 75-76, 78-80.

Luo, Fa-Long, et al., "Recent Developments in Signal Processing for Digital Hearing Aids", IEEE Signal Processing Magazine, (Sep. 2006), 103-106.

U.S. Appl. No. 12/749,702 , Response filed Aug. 27, 2012 to Non Final Office Action mailed May 25, 2012, 13 pgs.

U.S. Appl. No. 12/749,702, Final Office Action mailed Oct. 12, 2012, 7 pgs.

U.S. Appl. No. 12/749,702, Notice of Allowance mailed Mar. 4, 2013, 7 pgs.

U.S. Appl. No. 12/749,702, Response filed Feb. 12, 2013 to Final Office Action mailed Oct. 12, 2012, 10 pgs.

"U.S. Appl. No. 12/749,702, Non Final Office Action mailed May 25, 2012", 6 pgs.

"U.S. Appl. No. 13/933,017, Non Final Office Action mailed Sep. 18, 2014", 6 pgs.

"European Application Serial No. 10250710.0, Examination Notification Art. 94(3) mailed Jun. 25, 2014", 5 pgs.

* cited by examiner

EXTERNAL EAR CANAL VOICE DETECTION

RELATED APPLICATION

This application is a continuation of and claims the benefit of priority under 35 U.S.C. §120 to U.S. patent application Ser. No. 12/163,665, filed on Jun. 27, 2008, and issued as U.S. Pat. No. 7,929,713, which is divisional of and claims the benefit of priority under 35 U.S.C. §120 to U.S. application Ser. No. 10/660,454, filed on Sep. 11, 2003, now abandoned, the benefit of priority of each of which is claimed hereby, and each of which are incorporated by reference herein in its entirety.

TECHNICAL FIELD

This document generally relates to ear-level communication systems and particularly, but not by way of limitation, to such systems communicating with remote devices via full duplex audio.

BACKGROUND

Ear-level communication systems are used for hearing impaired individuals to use a communication device such as a cellular phone or other devices transmitting audio signals. They also allow private, hand-free use of such a communication device by individuals with normal hearing.

An ear-level communication system generally includes tethered or wireless headsets with a microphone boom or a microphone within a cord of the headset to detect voice of the person wearing the headsets. An alternative way to detect voice is via bone connection. Examples include a "clam" shell device that couples to the helix and a custom earmold with a vibration detector on the outer shell. Voice is picked up by detecting bone vibration caused by, and representative of, the voice of the person wearing the device.

Bi-directional communication has been achieved by a simplex system including a device in the ear canal that both transmits sound to and picks up sound within the ear canal. The device is tethered to a push-to-talk (PTT) system such as a walkie talkie. It is not full duplex and therefore requires interaction by the user in order to switch from listen mode to talk mode.

Voice operated exchange (VOX) is used to conserve energy when voice is not being detected or transmitted. For example, a headset system includes two ear pieces—for full duplex communication with one earpiece for transmitting and the other for receiving voice—and uses ear canal voice detection to trigger a VOX circuit in a control unit wired to the headset. The system requires a headset with two headphones and wires connecting the headphone to a control unit such as a device clipped on belt. In another example, a full duplex system includes a single headphone to transmit and receive voice, again with a VOX circuit in a control unit wired to the headphone.

Such ear-level communication systems are likely to be worn by person for log periods of time. Users with hearing loss may use such a system on a regular basis, both as a conventional hearing aid allowing communication directly with a person and as a hearing aid allowing communicating through another device. Users with normal hearing may wear such a system to be communicatively connected to another person or facility without the need to hold a device at any time. For appearance or secrecy reasons, minimal visibility is generally desirable. Wired connection between a headset or earpiece and a controller makes the system easily visible and is cumbersome to users who need to communicate while being physically active.

Thus, there is a need for an ear-level communication system that is not easily visible. A need related to miniaturization is that the longevity of the system between battery replacements or recharges.

SUMMARY

Ear-level full duplex audio communication systems each include one or two ear attachment devices, such as in-the-ear (ITE) or behind-the-ear (BTE) devices, that wirelessly communicates to a remote device. Such a system allows a hearing impaired individual to communicate with or through the remote device, such as to talk to another person through a cellular phone. Such a system also functions as an ear piece wirelessly extended from the remote device that allows an individual to privately communicate with or through the remote device without the need of holding the device.

In one embodiment, a system includes an earmold configured for use as an ITE device. The earmold houses a microphone for use in an ear canal, a processor, and a wireless transmitter. The microphone receives an occluded sound from about the ear canal. The processor processes the occluded sound. The wireless transmitter receives the processed occluded sound from the processor and transmits a wireless signal representing the occluded sound.

In one embodiment, a system includes an ITE module and a BTE module attached to the ITE module. The ITE module includes a microphone for use in an ear canal. The microphone receives an occluded sound from about the ear canal. The BTE module includes a processor and a wireless transmitter. The processor processes the occluded sound. The wireless transmitter receives the processed occluded sound from the processor and transmits a wireless signal representing the occluded sound.

In one embodiment, a system includes a first ear-level device and a second ear-level device for use in two opposite ears. The first ear-level device includes a microphone, a first processor, and a wireless transmitter. The microphone is for use in one ear canal to receive an occluded sound from about that ear canal. The first processor converts the occluded sound to an electrical signal. The wireless transmitter receives the electrical signal and transmits an outgoing wireless signal representing the occluded sound. The second ear-level device includes a wireless receiver, a second processor, and a speaker. The wireless receiver receives an incoming wireless signal representing a remote sound. The second processor converts the incoming wireless signal to the remote sound. The speaker is for use in the opposite ear canal to transmit the remote sound to that ear canal.

In one embodiment, an occluded sound is detected using a microphone placed in an ear canal. An incoming radio signal representing a remote sound from a remote device is also detected. A voice operated exchange (VOX) housed within an ear-level communication device is started when at least one of the occluded sound and the incoming radio signal is detected if the VOX is not already on. The ear-level communication device includes one of an ITE device and a BTE device. When the occluded sound is detected while the incoming radio signal is not detected, the occluded sound is gated on, and remote sound is gated off. When the incoming radio signal is detected while the occluded sound is not detected, the remote sound is gated on, and the occluded sound is gated off.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

In the drawings, which are not necessarily drawn to scale, like numerals describe similar components throughout the several views. The drawings illustrate generally, by way of example, but not by way of limitation, various embodiments discussed in the present document.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description provides examples, and the scope of the present invention is defined by the appended claims and their equivalents.

It should be noted that references to "an", "one", or "various" embodiments in this disclosure are not necessarily to the same embodiment, and such references contemplate more than one embodiment.

This document discusses, among other things, ear-level full duplex audio communication systems for communicating with remote devices. These systems each include one or two ear-level devices each worn in or about an ear, such as in-the-ear (ITE) or behind-the-ear (BTE) devices, wirelessly coupled to a remote device such as a computer, a personal digital assistant (PDA), a cellular phone, a walkie talkie, or a language translator. When used as a hearing aid, such a system allows a hearing impaired individual to communicate with or through the remote device, such as to talk to another person through a cellular phone. When being used as an ear piece wirelessly extended from the remote device, such system allows an individual with normal hearing to privately communicate with or through the remote device without the need of holding the device or wearing any device wired to the remote device.

In this document, "voice" includes to the sound of speech made by a person, and sound generally includes an audible signal that includes voice and other signals that can be heard and/or detected by an audio detector. Unless particularly indicated, for example, when voice is distinguished from sound by speech recognition, "voice" and "sound" are used interchangeably throughout thus document because they are not practically separated. For example, detection of a sound refers to the same action as detection of a voice because, while the purpose is to detect the voice, other sounds are picked up as well.

Figure 1:
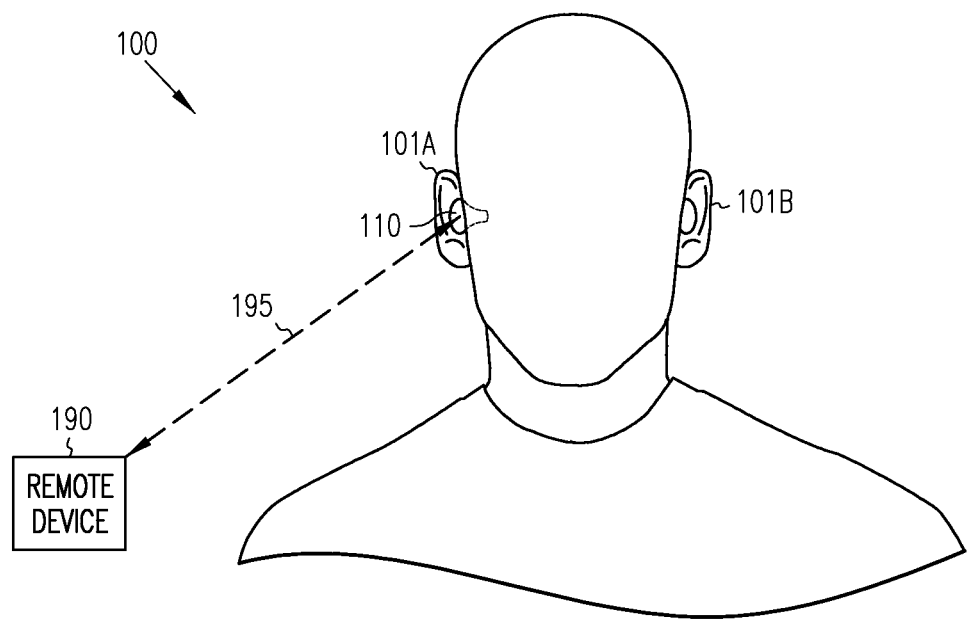
FIG. 1 is an illustration of an embodiment of an ear-level communication system and portions of an environment in which it is used. This ear-level communication system uses a single ear-level device.

FIG. 1 is an illustration of an embodiment of an ear-level communication system 100 and portions of an environment in which it is used. System 100 includes an ear-level device 110 attached to an ear 101A. Ear-level device 110 communicates with a remote device 190 through a wireless telemetry link 195. The other ear 101B is free of device attachment. Ear-level device 110 is a self-contained device including its own power source such as a replaceable or rechargeable battery. To maximize battery life or period between recharges, at least a portion of the circuit of ear-level device 110 is voice activated. That is, ear-level device 110 is activated only when it detects a need to transmit or receive a sound.

Ear-level device 110 is a full duplex audio device that allows two-way simultaneous conversation between ear 101A and remote device 190. In one embodiment, when being worn by a person having ear 101A, ear-level device 110 picks up sound from the ear canal of ear 101A and delivers sound to the same ear canal. It detects the occluded sound from the ear canal when the person speaks and transmits to the same ear canal a sound received from remote device 190 and/or a sound picked up from the environment surrounding the person. In one embodiment, as illustrated in FIG. 1, ear-level device 110 is configured for right ear attachment. In an alternative embodiment, ear-level device 110 is configured for left ear attachment.

Figure 2:
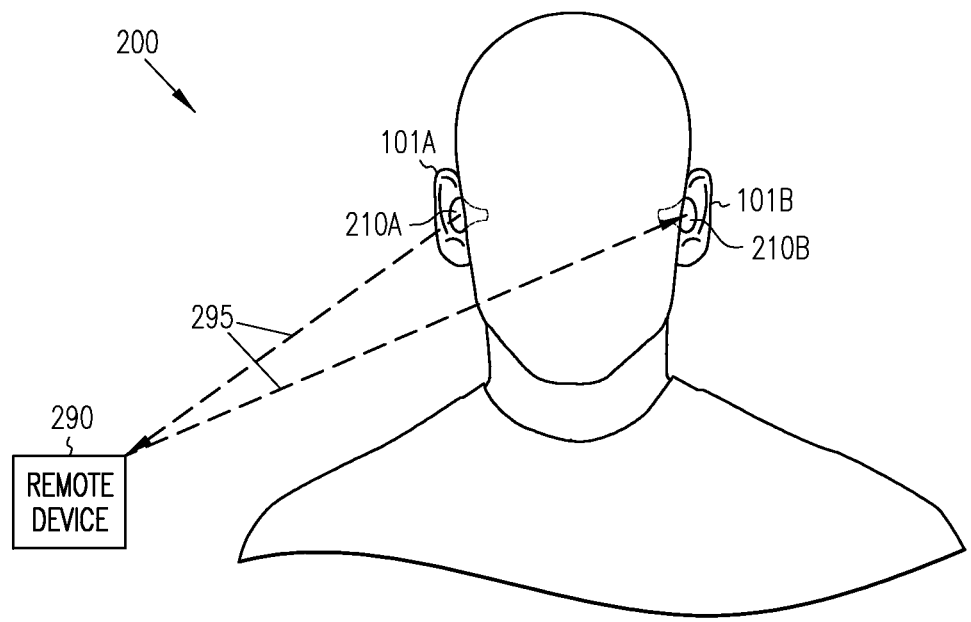
FIG. 2 is an illustration of an embodiment of another ear-level communication system and portions of an environment in which it is used. This ear-level communication system uses a pair of ear-level devices.

FIG. 2 is an illustration of an embodiment of an ear-level communication system 200 and portions of an environment in which it is used. System 200 includes a pair of ear-level devices 210A, attached to an ear 101A, and 210B, attached to ear 101B. Ear-level devices 210A and 210B communicate with a remote device 290 through a wireless telemetry link 295. Ear-level devices 210A and 210B are each a self-contained device including its own power source such as a replaceable or rechargeable battery. To maximize battery life or period between recharges, at least a portion of the circuit of each of ear-level devices 210A and 210B is voice activated. That is, ear-level devices 210A and 210B are each activated only when a need to transmit or receive a sound is detected by the device itself.

In one embodiment, ear-level device 210A is an audio transmitter that picks up sound from the ear canal of ear 101A, and ear-level device 210B is an audio receiver that delivers sound to the same ear canal. Ear-level device 210A is activated when it detects a sound from the ear canal. Ear-level device 210B is activated when it detects a signal from remote device 290. When both are being worn by a person, ear-level devices 210A and 210B supports full duplex audio allowing two-way simultaneous conversation between the person and remote device 290. In one embodiment, as illustrated in FIG. 2, ear-level device 210A is configured for right ear attachment, and ear-level device 210B is configured for left ear attachment. In an alternative embodiment, ear-level device 210A is configured for left ear attachment, and ear-level device 210B is configured for right ear attachment.

Figure 3A:
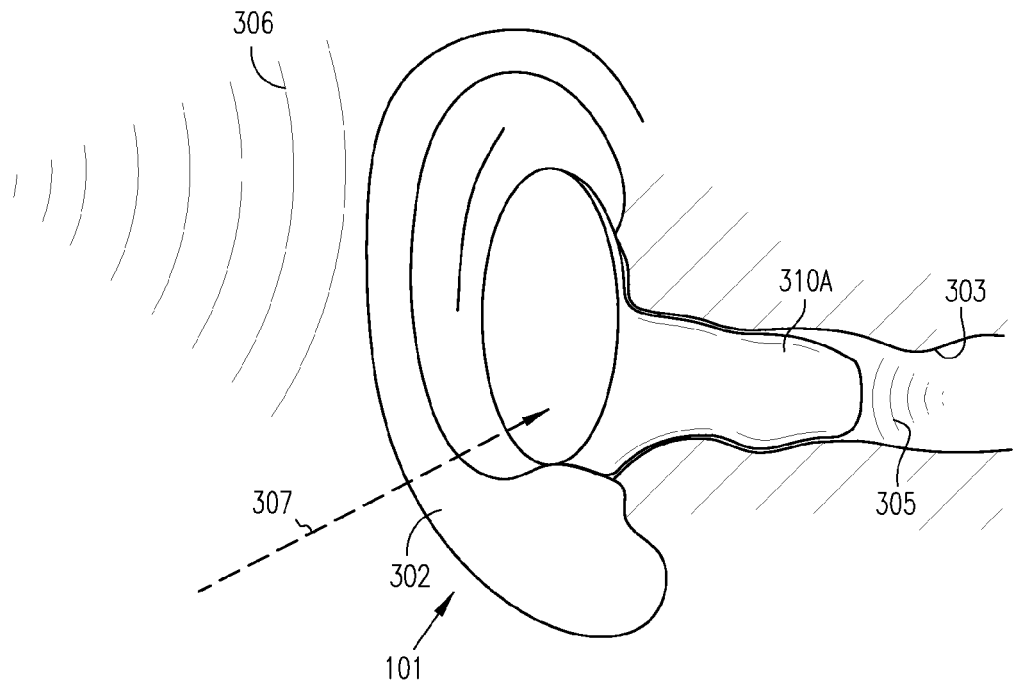
FIG. 3A is an illustration of one exemplary exterior configuration of an in-the-ear (ITE) device used as the single ear-level device of FIG. 1 or one of the pair of ear-level devices of FIG. 2.
Figure 3B:
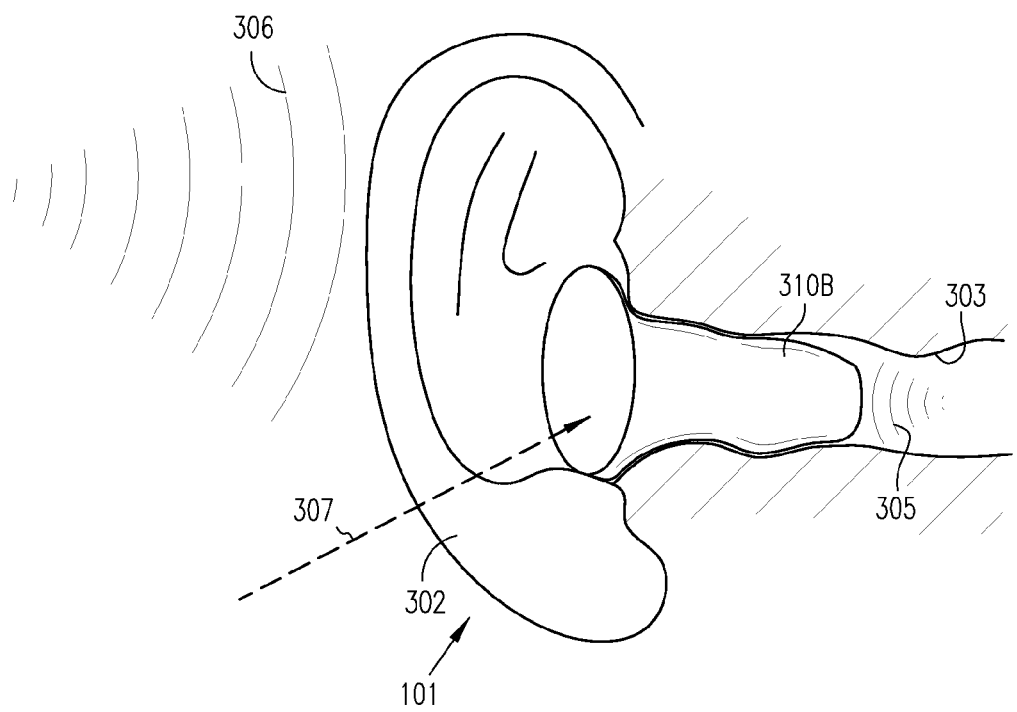
FIG. 3B is an illustration of one exemplary exterior configuration of an in-the-canal (ITC) device used as the single ear-level device of FIG. 1 or one of the pair of ear-level devices of FIG. 2.
Figure 3C:
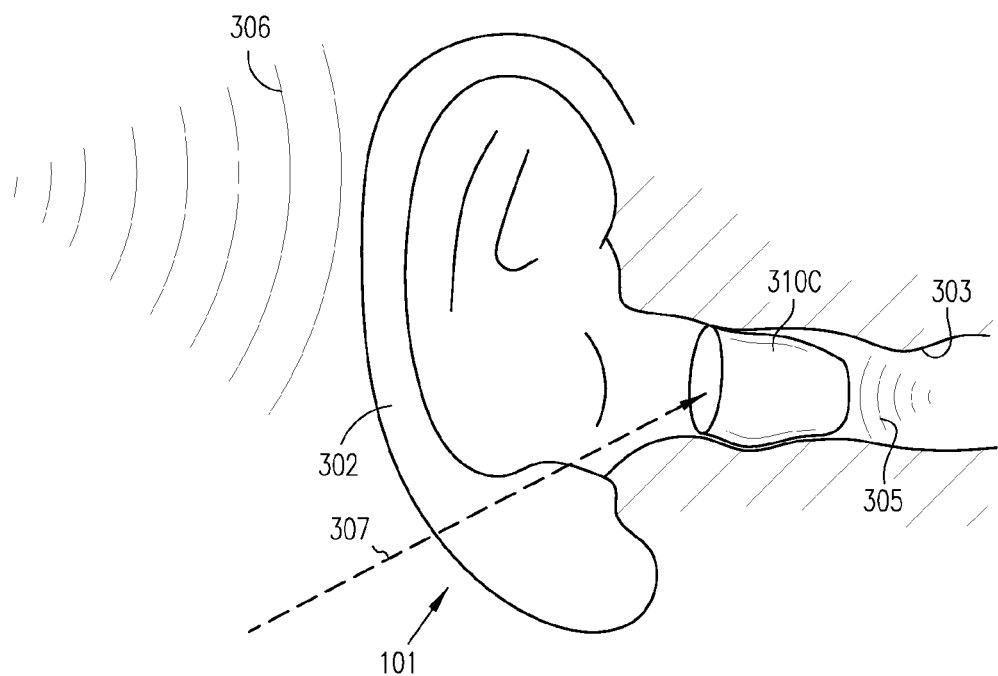
FIG. 3C is an illustration of one exemplary exterior configuration of a completely-in-the-canal (CIC) device used as the single ear-level device of FIG. 1 or one of the pair of ear-level devices of FIG. 2.

FIGS. 3A, 3B, and 3C are illustrations of exemplary exterior configuration of ear-level device 110 or one of ear-level devices 210A and 210B. For the purpose of this document, only a device attached to a right ear is shown for each exemplary exterior configuration. It is to be understood that each of ear-level devices 110, 210A, and 210B can be either a device configured for right ear attachment or a device configured for left ear attachment. Generally, a device configured for right ear attachment has an exterior configuration that is substantially symmetrical to that of a device of the same type configured for left ear attachment. In system 100, a single ear-level device 110 is a device configured either for right ear attachment or for left ear attachment. In system 200, either one of ear-level device 210A and 210B is a device configured for right ear attachment, while the other is a device configured for left ear attachment.

An occluded sound 305, an ambient sound 306, and a remote sound 307 are illustrated in each of FIGS. 3A, 3B, and 3C. Remote sound 307 is represented by a wireless radio signal transmitted to ear-level device 110. In this document, "occluded sound" includes occluded sound 305, "ambient sound" includes ambient sound 306, and "remote sound" includes remote sound 307.

FIG. 3A is an illustration of an exemplary exterior configuration of an in-the-ear (ITE) device 310A used as ear-level device 110 or one of ear-level devices 210A and 210B. As shown in FIG. 3A, ITE device 310A is attached to an ear 101 with a pinna 302 and an ear canal 303. ITE device 310A includes a portion inserted into ear canal 303 and another portion fit into the cavity formed by pinna 302.

FIG. 3B is an illustration of an exemplary exterior configuration of an in-the-canal (ITC) device 310B used as ear-level device 110 or one of ear-level devices 210A and 210B. As shown in FIG. 3B, ITC device 310B is attached to ear 101 with pinna 302 and ear canal 303. ITC device 310B is a form of ITE device that also includes a portion inserted in ear canal 303 and another portion fit into the cavity formed by pinna 302, but the latter portion is smaller than that of ITE device 310A. Its overall size is therefore generally smaller than that of ITE device 310A.

FIG. 3C is an illustration of an exemplary exterior configuration of a completely-in-the-canal (CIC) device 310C used as ear-level device 110 or one of ear-level devices 210A and 210B. As shown in FIG. 3C, CIC device 310C is attached to ear 101 with pinna 302 and ear canal 303. CIC device 310C is a form of ITC device but includes only a portion that is completed inserted into ear canal 303. Its overall size is therefore generally smaller than that of ITC device 310B.

In one embodiment, each of ITE device 310A, ITC device 310B, and CIC device 310C includes a custom earmold. In another embodiment, each of ITE device 310A, ITC device 310B, and CIC device 310C includes a modular earmold. In one embodiment, the earmold is fully occluded to maximize audio efficiency. In another embodiment, the earmold is vented to remove undesirable low frequency sound.

The choice of a device type, such as from the types shown in FIGS. 3A, 3B, and 3C, depends on the need of individual users. For example, ITE device 310A has a relatively large size to accommodate a relatively large amplifier to serve the need of individuals suffering severe hearing loss. The relatively large size can also be utilized to house a relatively large size battery. On the other hand, CIC device 310C is almost invisible, while the room for the circuit and the battery is very limited. Generally, the selection of the device type is a compromise among considerations such as the user's degree of hearing loss (if applicable), ear canal size, desire of invisibility, desired longevity between battery replacements or recharges, and cost.

Figure 4A:
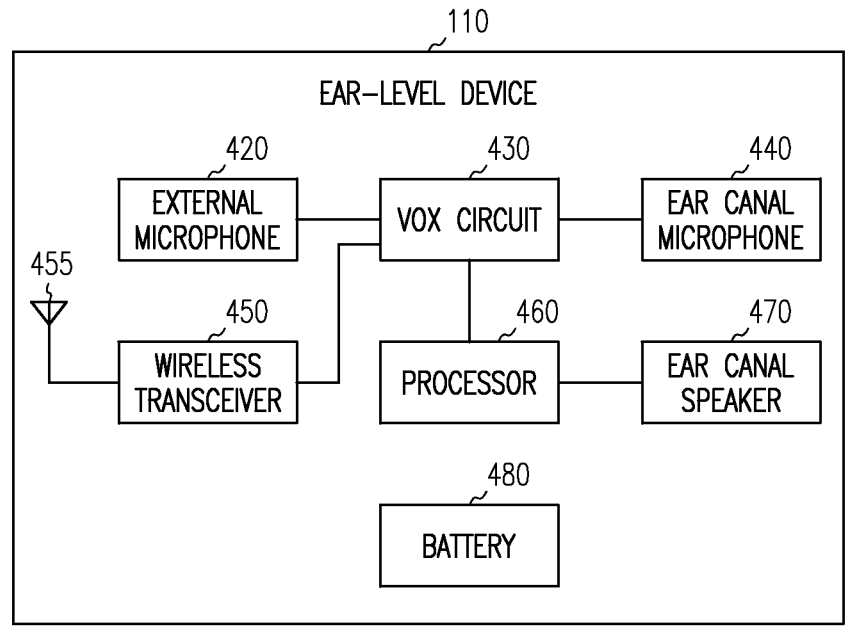
FIG. 4A is a block diagram showing one embodiment of the circuit of ear-level device shown in FIG. 3A, 3B, or 3C used as the single ear-level device of FIG. 1.

FIG. 4A is a block diagram showing one embodiment of the circuit of ear-level device shown in FIG. 3A, 3B, or 3C used as the single ear-level device 110. The circuit is housed in an earmold configured for use as one of the device types illustrated as ear-level devices 310A, 310B, or 310C.

Ear-level device 110 includes an external microphone 420, an ear canal microphone 440, an ear canal speaker 470, a processor 460, a wireless transceiver 450, an antenna 455, a voice operated exchange (VOX) circuit 430, and a battery 480. External microphone 420 picks up ambient sound such that a hearing impaired person wearing ear-level device 110 is not "isolated" when communicating to remote device 190. Thus, ear-level device enables the hearing impaired person to talk to another person either directly (if the other person is nearby) or through a device such as a cell phone. Ear canal microphone 440 detects sound from the ear canal. The sound includes primarily speech of the person wearing ear-level device 110. Ear canal speaker 470 transmits sound received from remote device 190 and/or external microphone 420 to the same ear canal. In one embodiment, ear canal microphone 440 and ear canal speaker 470 are implemented as one physical device. Processor 460 converts the sound picked up from the ear canal to an electrical signal to be transmitted to remote device 190, and converts the signals received from remote device 190 and/or external microphone 420 to a sound audible to the person wearing ear-level device 110. In one embodiment, processor 460 includes one or more of amplification circuitry, filtering circuitry, acoustic feedback reduction circuitry, noise reduction circuitry, and tone control circuitry, among other circuits performing signal processing functions as known in the art. In one embodiment, processor 460 includes a speech recognition module to enhance the audio signal received by and/or transmitted from ear-level device 110. Wireless transceiver 450 and antenna 455 form a telemetry interface supporting telemetry link 195 between ear-level device 110 and remote device 190. Wireless transceiver 450 includes a wireless transmitter and a wireless receiver. The wireless transmitter receives the electrical signal representing the sound picked up from the ear canal from processor 460 and transmits an outgoing wireless signal representing the same sound to remote device 190. The wireless receiver receives an incoming wireless signal representing a remote sound from remote device 190 and transmits an electrical signal representing the remote sound to processor 460. Telemetry link 195 provides for bi-directional communication allowing simultaneous signal transmission, in both directions, between ear-level device 110 and remote device 190. VOX circuit 430 activates a major portion of ear-level device 110 only when sound is detected by at least one of external microphone 420, ear canal microphone 440, and wireless transceiver 450. In one embodiment, VOX circuit 430 includes a voice-controlled switch connecting between battery 480 and the portions of ear-level device 110 that are voice activated. The switch is driven by the sound detected by at least one of external microphone 420, ear canal microphone 440, and wireless transceiver 450. It is turned on when sound detected by external microphone 420 exceeds a predetermined threshold, when sound detected by ear canal microphone 440 exceeds another predetermined threshold, and/or when wireless transceiver 450 receives the incoming wireless signal representing the remote sound. In one embodiment, as discussed with respect to FIG. 4B below, VOX circuit 430 gates or attenuates one or more sounds detected by external microphone 420, ear canal microphone 440, and wireless transceiver 450, to eliminate or reduce echo and ringing caused by the loop formed by ear canal speaker 470 and ear canal microphone 440. Battery 480 supplies the power needed for the operation of ear-level device 110. In one embodiment, battery 480 is a rechargeable battery that can be recharged without being taken out from ear-level device 110.

Figure 4B:
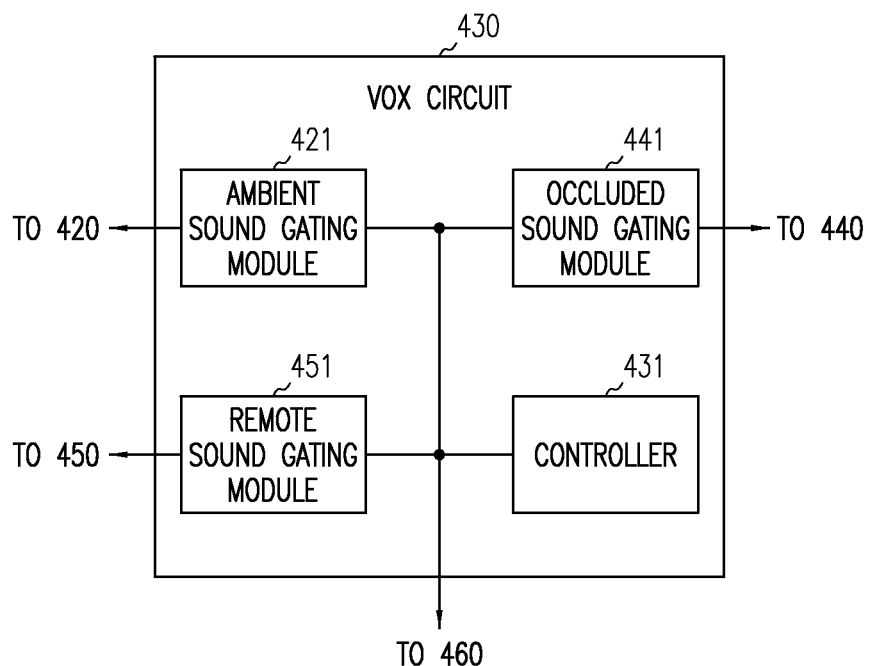
FIG. 4B is a block diagram showing one embodiment of portions of a voice operated exchange (VOX) circuit included in the single ear-level device of FIG. 1.

FIG. 4B is a block diagram showing one embodiment of portions of VOX circuit 430. In this embodiment, VOX circuit 430 includes an ambient sound gating module 421 that blanks or attenuates the sound detected by external microphone 420, an occluded sound gating module 441 that blanks or attenuates the sound detected by ear canal microphone 440, a remote sound gating module 451 that blanks or attenuates the sound detected by wireless transceiver 450, and controller 431 to coordinate the states of the gating modules. Because ear canal microphone 440 is capable of detecting the sound delivered to the ear canal from ear canal speaker 470, there is a need to avoid echo and/or ringing. For example, a remote sound from remote device 190 delivered to the ear canal may be detected as an occluded sound and transmitted back to remote device 190, causing echo. The gating modules function in a coordinated manner to eliminate or reduce such echo and/or ringing caused by breaking, or applying resistance into, the audio loop formed by ear canal speaker 470 and ear canal microphone 440.

For the purpose of description, each of the gating modules is "on" when sound is "gated on" and "off" when the sound is "gated off." A sound is "gated on" when it is allowed to pass and be processed, and is "gated off" when it is blanked or substantially attenuated. Blanking refers to a substantially complete blockage of a sound, or in other words, that a detected sound is practically ignored by processor 460 such that it does not cause any echo or ringing that is audible by an ear. Substantial attenuation refers to an attenuation after which the attenuated sound does not cause any echo or ringing having an intolerable intensity.

Ambient sound gating module 421 includes a voice-driven switch or attenuator driven by the output of a comparator that compares the amplitude of a detected ambient sound with a predetermined threshold for the ambient sound. When the amplitude of the detected ambient sound exceeds the threshold for the ambient sound, and when controller 431 permits, ambient sound gating module 421 is turned on. When the amplitude of the detected ambient sound drops below the threshold for the ambient sound, ambient sound gating module 421 is turned off. In one embodiment, after the amplitude of the detected ambient sound drops below the threshold for the ambient sound, ambient sound gating module 421 is turned off after a predetermined delay.

Occluded sound gating module 441 includes a voice-driven switch or attenuator driven by the output of a comparator that compares the amplitude of a detected occluded sound with a predetermined threshold for the occluded sound. When the amplitude of the detected occluded sound exceeds the threshold for the occluded sound, and when controller 431 permits, occluded sound gating module 441 is turned on. When the amplitude of the detected occluded sound drops below the threshold for the occluded sound, occluded sound gating module 441 is turned off. In one embodiment, after the amplitude of the detected occluded sound drops below the threshold for the occluded sound, occluded sound gating module 441 is turned off after a predetermined delay.

In one embodiment, remote sound gating module 451 includes a voice-driven switch or attenuator driven by the output of a comparator that compares the amplitude of a remote sound with a predetermined threshold for the remote sound. When the amplitude of the detected remote sound exceeds the threshold for the remote sound, and when controller 431 permits, remote sound gating module 451 is turned on. When the amplitude of the detected remote sound drops below the threshold for the remote sound, remote sound gating module 451 is turned off. In one embodiment, after the amplitude of the detected remote sound drops below the threshold for the remote sound, remote sound gating module 451 is turned off after a predetermined delay.

In another embodiment, remote sound gating module 451 includes a switch or attenuator driven by the detection of the incoming wireless signal representing the remote sound. Remote sound gating module 451 is turned on upon detection of the incoming wireless signal when controller 431 permits, and turned off when the incoming wireless signal is no longer detected. In one embodiment, remote sound gating module 451 is turned off after the incoming wireless signal is absent for a predetermined period.

Controller 431 coordinates the on/off states of all the gating modules so the sounds are processed in an orderly fashion. Even if a sound is detected, the gating module corresponding to that sound is turned on only when controller 431 permits. In one embodiment, assuming that sounds A and B are gated by gating modules A and B, respectively, if both sounds A and B are detected, whichever sound is detected earlier is gated on. That is, if sound A exceeds its threshold first, gating module A is turned on and remain on until sound A drops below threshold A. Then, gating module B is turned only if sound B exceeds its threshold after gating module A has been turn off.

In one embodiment, controller 431 coordinates the on/off states of all the gating modules according to predetermined or programmed gating coordination rules. According to one exemplary rule, ambient sound gating module 421 is off, occluded sound gating module 441 is off, and remote sound gating module 451 is on. This rule allows only the transmission of the remote sound to ear canal 303, and prevents the remote sound from being detected by ear canal microphone 440 and echoed back to remote device 190. According to another exemplary rule, ambient sound gating module 421 is on, occluded sound gating module 441 is off, and remote sound gating module 451 is on. This rule allows the transmission of both the remote sound and the ambient sound to ear canal 303, and prevents the remote sound from being detected by ear canal microphone 440 and echoed back to remote device 190. This also prevents the ambient sound from being transmitted to remote device 190. According to yet another exemplary rule, ambient sound gating module 421 is off, occluded sound gating module 441 is on, and remote sound gating module 451 is off. When the person wearing ear-level device 110 speaks, both external microphone 420 and ear canal microphone 440 detect the voice. The voice as detected by ear-level device 110 is first transmitted to remote device 190. Without the gating modules (or when ambient sound gating module 421 and occluded sound gating module 441 are both on), the same voice as detected by external microphone 420 is transmitted to ear canal 303, and therefore again detected by ear canal microphone 440, and again be transmitted to remote device 190. This rule allows only the transmission of the occluded sound to remote device 190, and prevents the same sound from being transmitted to remote device 190 twice. Other rules are applied as a person skilled in the art should see fit based on an understanding after reading this entire document.

Figure 5:
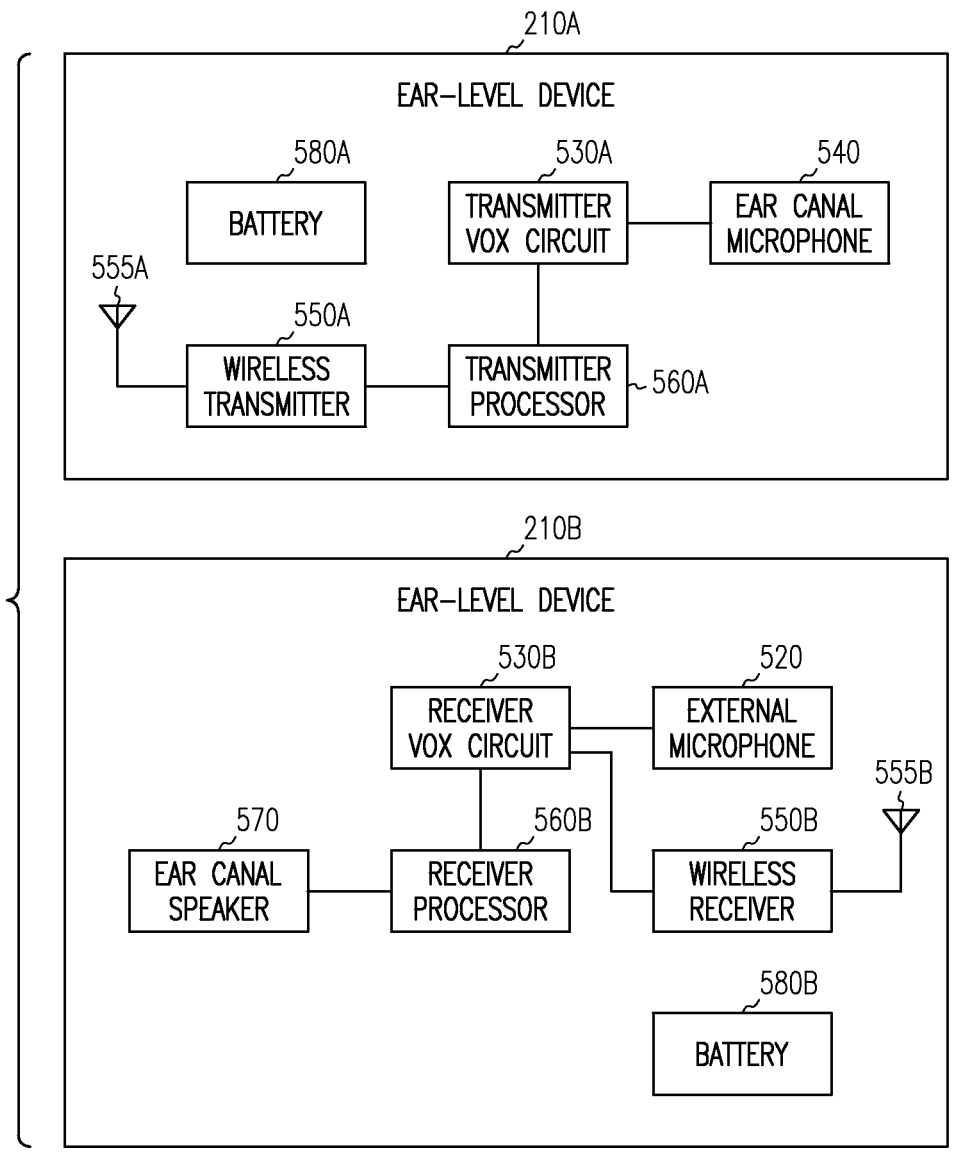
FIG. 5 is a block diagram showing another embodiment of the circuit of ear-level device shown in FIG. 3A, 3B, or 3C used as the pair of ear-level devices of FIG. 1B.

FIG. 5 is a block diagram showing another embodiment of the circuit of ear-level device shown in FIG. 3A, 3B, or 3C used as each of ear-level devices 210A and 210B. The circuit of each of ear-level devices 210A and 210B is housed in an earmold configured for use as of one of the device types illustrated as ear-level devices 310A, 310B, or 310C.

Ear-level device 210A is an audio transmitter that includes an ear canal microphone 540, a processor 560A, a wireless transmitter 550A, an antenna 555A, a transmitter VOX circuit 530A, and a battery 580A. Ear canal microphone 540 detects sound from the ear canal. The sound includes primarily speech of the person wearing ear-level device 210A. Processor 560A converts the sound picked up from the ear canal to an electrical signal to be transmitted to remote device 290. In one embodiment, processor 560A includes one or more of amplification circuitry, filtering circuitry, acoustic feedback reduction circuitry, noise reduction circuitry, and tone control circuitry, among other circuits performing signal processing functions as known in the art. In one embodiment, processor 560A includes a speech recognition module used to enhance the sound transmitted from ear-level device 210A. Wireless transmitter 550A and antenna 555A form a telemetry interface supporting signal transmission from ear-level device 210A to remote device 290. Wireless transmitter 550A receives the electrical signal representing the sound picked up from the ear canal from processor 560A and transmits an outgoing wireless signal representing the same sound to remote device 290. VOX circuit 530A activates a major portion of ear-level device 210A only when sound is detected by ear canal microphone 540. In one embodiment, VOX circuit 530A includes a voice-controlled switch connecting between battery 580A and the portions of ear-level device 210A that are voice activated. The switch is driven by the sound detected by ear canal microphone 540. It is turned on when sound detected by ear canal microphone 540 exceeds a predetermined threshold. In one embodiment, VOX circuit 530A activates processor 560A when the sound is detected. In one further embodiment, VOX circuit 530A also activates wireless transmitter 550A when the sound is detected. Battery 580A supplies the power needed for the operation of ear-level device 210A. In one embodiment, battery 580A is a rechargeable battery that can be recharged without being taken out from ear-level device 210A.

Ear-level device 210B is an audio receiver that includes an external microphone 520, an ear canal speaker 570, a processor 560B, a wireless receiver 550B, an antenna 555B, a receiver VOX circuit 530B, and a battery 580B. External microphone 520 picks up ambient sound such that the person wearing ear-level devices 210A and 210B is not "isolated" when communicating to remote device 290. It allows that person to talk to a nearby person directly, without the need to take off ear-level devices 210A and/or 210B. Ear canal speaker 570 transmits sound received from remote device 290 and/or external microphone 520 to the same ear canal. Processor 560B converts the signals received from remote device 290 and/or external microphone 520 to a sound audible to the person wearing ear-level device 210B. In one embodiment, processor 560B includes one or more of amplification circuitry, filtering circuitry, acoustic feedback reduction circuitry, noise reduction circuitry, and tone control circuitry, among other circuits performing signal processing functions as known in the art. In one embodiment, processor 560B includes a speech recognition module used to enhance the audio signals received by ear-level device 210B. Wireless receiver 550B and antenna 555B form a telemetry interface supporting signal transmission from remote device 290 to ear-level device 210B. Wireless receiver 550B receives an incoming wireless signal representing a remote sound from remote device 290 and transmits an electrical signal representing the remote sound to processor 560B. VOX circuit 530B activates a major portion of ear-level device 110 only when sound is detected by at least one of external microphone 520 and wireless receiver 550B. In one embodiment, VOX circuit 530B includes a voice-controlled switch connecting between battery 580B and the portions of ear-level device 210B that are voice activated. The switch is driven by the sound detected by at least one of external microphone 520 and wireless receiver 550B. It is turned on when sound detected by external microphone 520 exceeds a predetermined threshold and/or when wireless transceiver 550B receives the incoming wireless signal representing the remote sound. In one embodiment, VOX circuit 530B activates processor 560B when the sound is detected. In one further embodiment, VOX circuit 530B also activates ear-level speaker 570 when the sound is detected. Battery 580B supplies the power needed for the operation of ear-level device 210B. In one embodiment, battery 580B
is a rechargeable battery that can be recharged without being taken out from ear-level device 210B.

System 200 accommodates a larger overall circuit size without necessarily increasing the size of each ITE device. While two separate ear-level devices are required, because system 200 includes separate audio transmitter (ear-level device 210A) and receiver (ear-level device 210B) disposed in the ear canals of opposite ears, ear canal speaker 570 and ear canal microphone 540 do not form a loop causing echo and ringing.

Figure 6:
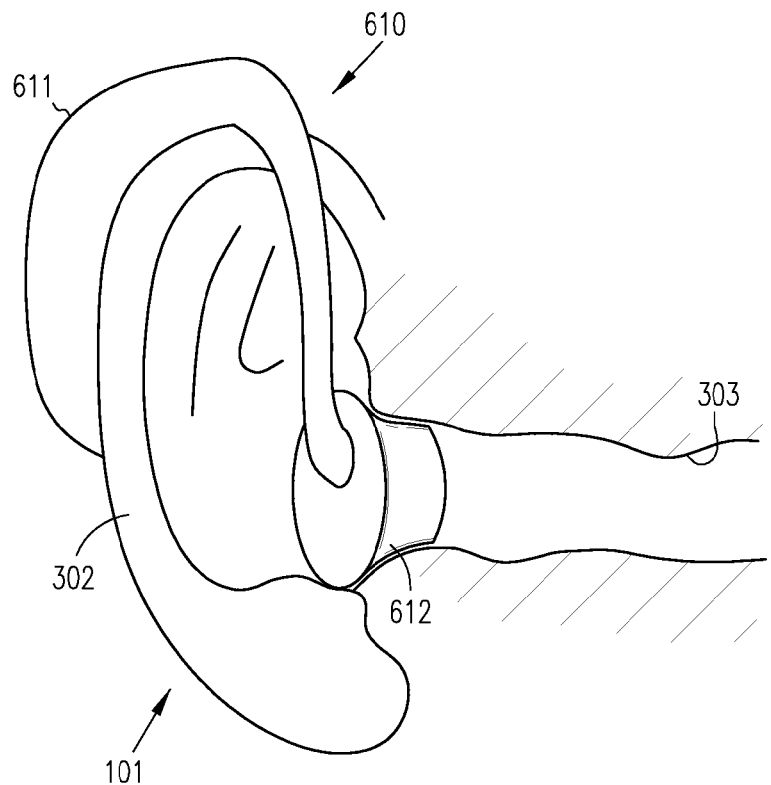
FIG. 6 is an illustration of one exemplary exterior configuration of an ear-level device including a behind-the-ear (BTE) device used as the single ear-level device of FIG. 1 or one of the pair of ear-level devices of FIG. 2.

FIG. 6 is an illustration of an exemplary exterior configuration of an ear-level device including a behind-the-ear (BTE) device 610 used as ear-level device 110 or one of ear-level devices 210A and 210B. BTE device 610 is attached to ear 101 with pinna 302 and ear canal 303. In one embodiment, BTE device 610 is used when none of ITE device 310A, ITC device 310B, and CIC device 310C provides sufficient space accommodating the required circuit and battery sizes. For the purpose of this document, only a device attached to a right ear is shown for each exterior structure. It is to be understood that each of ear-level devices 110, 210A, and 210B can be either a BTE device configured for right ear attachment or a BTE device configured for left ear attachment. Generally, a BTE device configured for right ear attachment has a substantially symmetrical appearance to a device of the same type configured for left ear attachment. In system 100, ear-level device 110 is a device configured either for right ear attachment or for left ear attachment. In system 200, either one of ear-level device 210A and 210B is a device structured for right ear attachment, while the other is a device structured for left ear attachment.

BTE device 610 includes a behind-the-ear module (BTE module) 611 and an in-the-ear module (ITE module) 612. ITE module 612 includes a custom or modular earmold. In one embodiment, the earmold is fully occluded to maximize audio efficiency. In another embodiment, the earmold is vented to remove undesirable low frequency sound.

Figure 7:
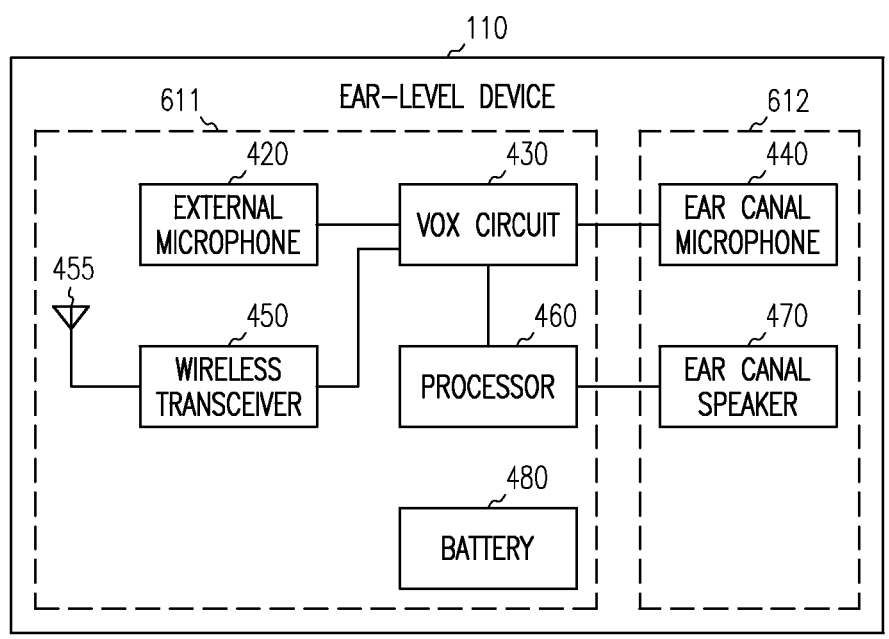
FIG. 7 is a block diagram showing one embodiment of the circuit of the ear-level device shown in FIG. 6 used as the single ear-level device of FIG. 1.

FIG. 7 is a block diagram showing one embodiment of the circuit of ear-level device shown in FIG. 6 used as ear-level device 110. The exterior configuration of ear-level device 110 is of the type illustrated as BTE device 610.

Ear-level device 110 configured as BTE device 610 differs from ear-level device 110 configured as ITE/ITC/CIC devices 310A/310B/310C primarily in the physical arrangement of device components. By way of example, but not by way of limitation, FIG. 7 illustrates one embodiment in which BTE module 611 includes external microphone 420, processor 460, wireless transceiver 450, antenna 455, VOX circuit 430, and battery 480, and ITE module 612 includes ear canal microphone 440 and ear canal speaker 470. Other possible embodiments depend on size and other considerations that are known to those skilled in the art. In one embodiment, behind-ear portion 611 includes only battery 480 to maximize the duration of use of ear-level device 110 between battery replacements or recharges.

Figure 8:
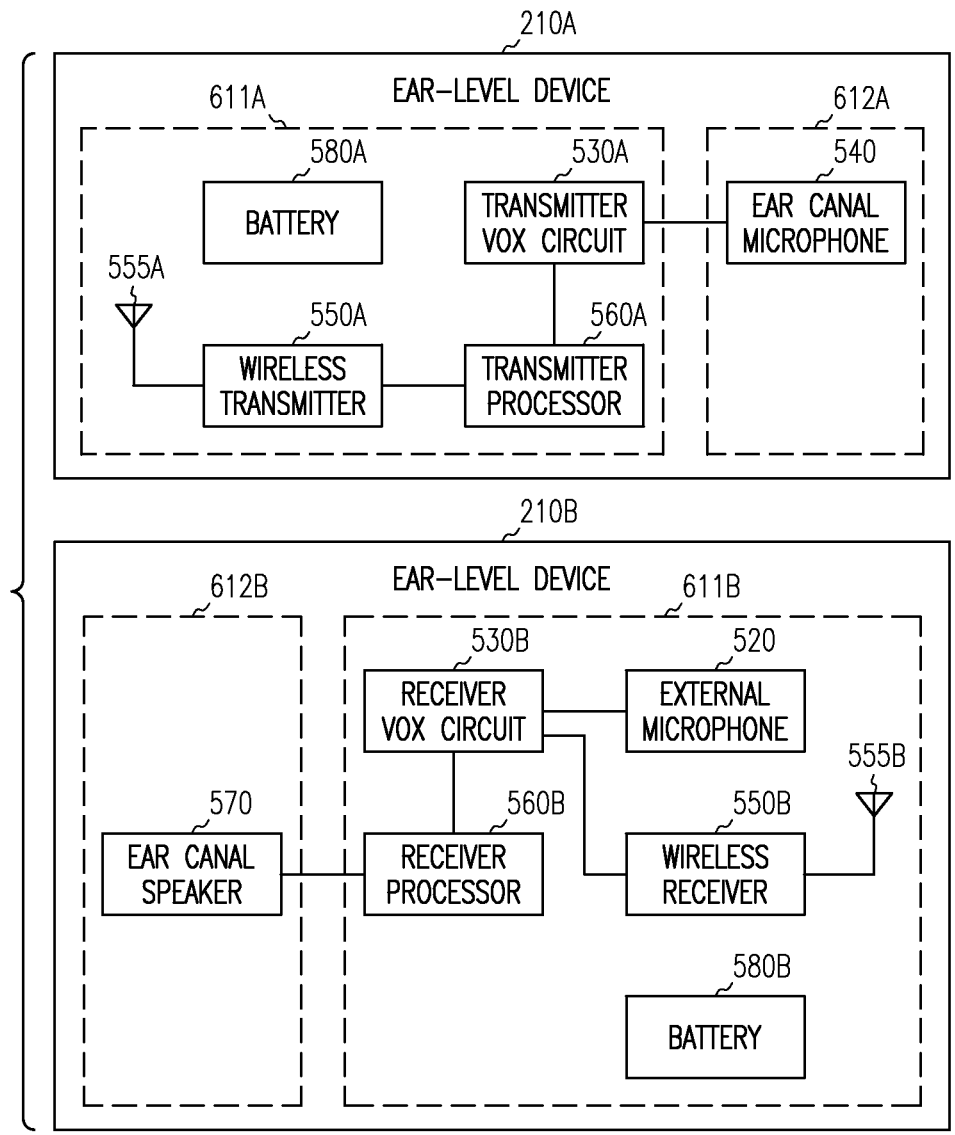
FIG. 8 is a block diagram showing another embodiment of the circuit of ear-level device shown in FIG. 6 used as the pair of ear-level devices of FIG. 2.

FIG. 8 is a block diagram showing another embodiment of the circuit of ear-level device shown in FIG. 6 used as each of ear-level devices 210A and 210B. The exterior configuration of each of ear-level devices 210A and 210B is of the type illustrated as BTE device 610.

Ear-level devices 210A/210B configured as BTE device 610 differ from ear-level devices 210A/210B configured as ITE/ITC/CIC devices 310A/310B/310C primarily in the physical arrangement of device components. By way of example, but not by way of limitation, FIG. 8 illustrates one embodiment of ear-level device 210A including a BTE module 611A and an ITE module 612A, and ear-level device 210B including a BTE module 611B and an ITE module 612B. BTE module 611A includes processor 560A, wireless transmitter 550A, antenna 555A, transmitter VOX circuit 530A, and battery 580A. ITE module 612A includes ear canal microphone 540. Behind-the-ear portion 611B includes external microphone 520, processor 560B, wireless receiver 550B, antenna 555B, receiver VOX circuit 530B, and battery 580B. ITE module 612B includes ear canal speaker 570. Other possible embodiments depend on size and other considerations that are known to those skilled in the art. In one embodiment, BTE modules 611A and 611B include only batteries 580A and 580B, respectively, to maximize the duration of use of ear-level devices 210A and 210B, respectively, between battery replacements or recharges.

Figure 9:
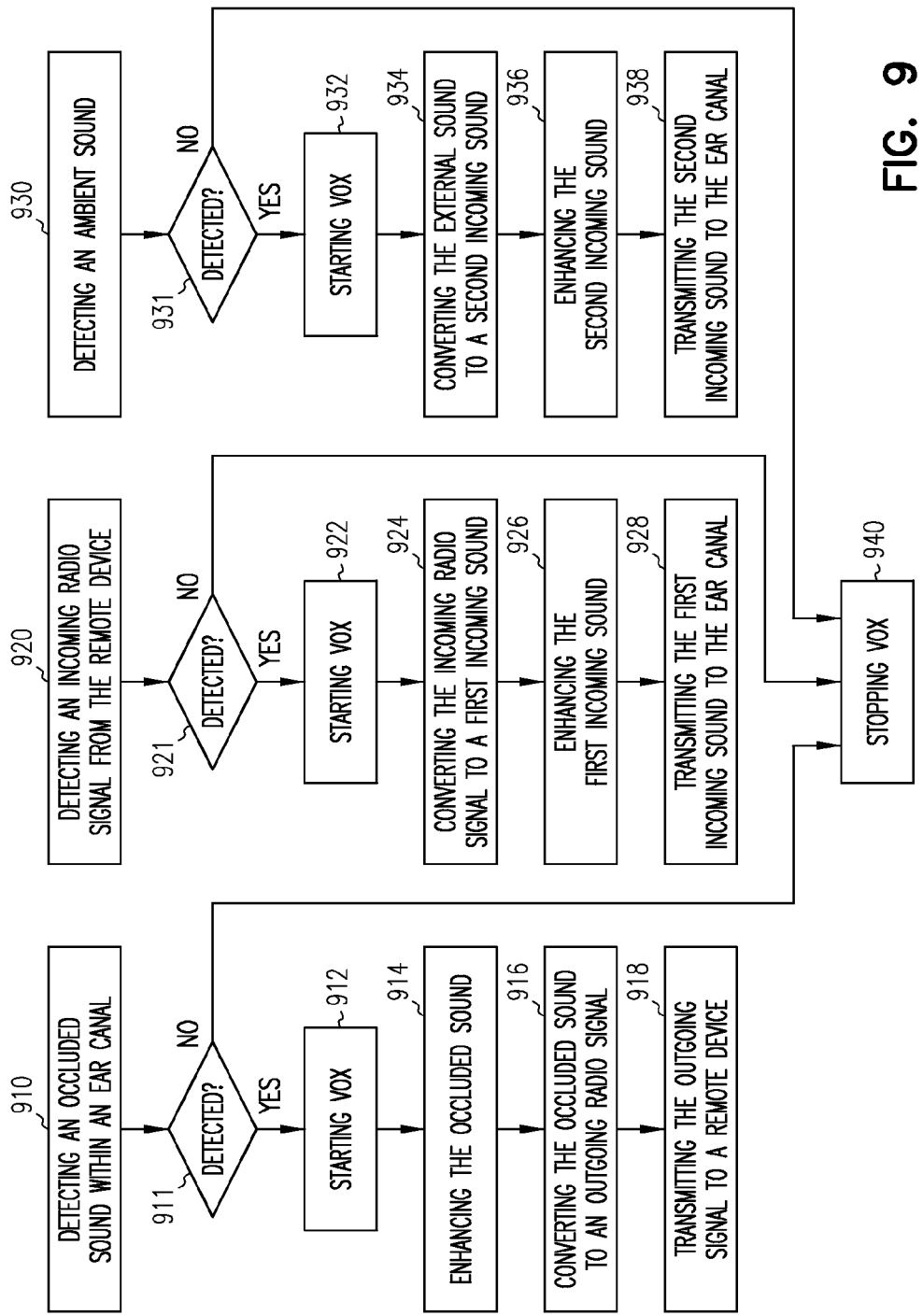
FIG. 9 is a flow chart illustrating an embodiment of a method for audio communication between the single ear-level device or the pair of ear-level devices and a remote device.

FIG. 9 is a flow chart illustrating an embodiment of a method for audio communication using system 100 or system 200. The method provides for private, simultaneous two-way communication between a person and a remote device such as a computer, a personal digital assistant (PDA), a cellular phone, a walkie talkie, or a language translator. In this embodiment, VOX is used for power management. A VOX circuit includes a power switch connecting a battery to the portions of the circuit of system 100 or system 200 that are voice activated. The VOX is "on" when the voice-activated portions of the circuit are activated, i.e., when the power switch remains on. It is "started" by turning on the power switch, and "stopped" by turning off the power switch.

Steps 910-918 illustrate the process of detecting a sound from an ear canal and transmitting it to a remote device. A microphone disposed in an ear canal detects an occluded sound within the ear canal at 910. If the occluded sound is detected at 911, the VOX of the system is started at 912 if it is not already on. The occluded sound is enhanced at 914 with a voice recognition system that improves the signal-to-noise ratio, where the signal is the voice of a speech, and the noise is any sound other than the voice of the speech. The occluded sound is then converted to an outgoing radio signal at 916. The outgoing radio signal representing the occluded sound is transmitted to the remote device at 918.

Steps 920-928 illustrate the process of detecting a sound sent from the remote device and transmitting it to the ear canal. A radio receiver detects an incoming radio signal representing a remote sound from the remote device at 920. If the incoming radio signal is detected at 921, the VOX of the system is started at 922 if it is not already on. The incoming radio signal is converted to a first incoming audio signal (the remote sound) at 924. The first incoming audio signal is enhanced at 926 with a voice recognition system that improves the signal-to-noise ratio, where the signal is the voice from the remote device, and the noise is any sound other than the voice. A speaker disposed in the ear canal transmits the first incoming audio signal representing the sound from the remote device to the ear canal at 928.

Steps 930-938 illustrate the process of detecting a sound from the environment and transmit it to the ear canal. A microphone outside the ear canal detects an ambient sound at 930. If the ambient sound is detected at 931, the VOX of the system is started at 932 if it is not already on. The ambient sound is converted to a second incoming audio signal at 934. The second incoming audio signal is enhanced at 936 with a voice recognition system that improves the signal-to-noise ratio, where the signal is any voice included in the ambient sound, and the noise is any sound other than the voice. A speaker disposed in the ear canal transmits the second incoming audio signal representing to the ear canal at 928.

If no signal (sound or radio signal) is detected at 911, 921, and 931, the VOX is stopped at 940. In other words, if no sound is to be processed, the communication system is inactivated except for the portions that must be active for sound detection at all times. In one embodiment, the VOX is stopped after a predetermined period of time to avoid frequent activation/deactivation during a conversation.

Systems 100 and 200 are each a full duplex system capable of performing steps 910-918, 920-928, and 930-938 are performed in parallel and simultaneously. In an embodiment in which system 100 performs the method, ear-level device 110 performs steps 910-918, 920-928, and 930-938. If a signal is detected at 911, 921, or 931, VOX 430 activates at least portions of device 110 performing steps 914-918, 924-928, or 934-938, respectively. If no signal is detected at 911, 921, or 931, VOX 430 deactivates at least the portions of device 110 performing steps 914-918, 924-928, or 934-938, respectively.

In an embodiment in which system 200 performs the method, ear-level device 210A performs steps 910-918, and ear-level device 210B performs steps 920-928 and 930-930. If a signal is detected at 911, transmitter VOX 530A activates at least portions of device 210A performing steps 914-918. If a signal is detected at 921 or 931, receiver VOX 530B activates at least portions of device 210B performing steps 924-928 or 934-938, respectively. If no signal is detected at 911, transmitter VOX 530A deactivates at least the portions of device 210A performing steps 914-918. If no signal is detected at 921 or 931, receiver VOX 530B deactivates at least the portions of device 210B performing steps 924-928 or 934-938, respectively.

Figure 10:
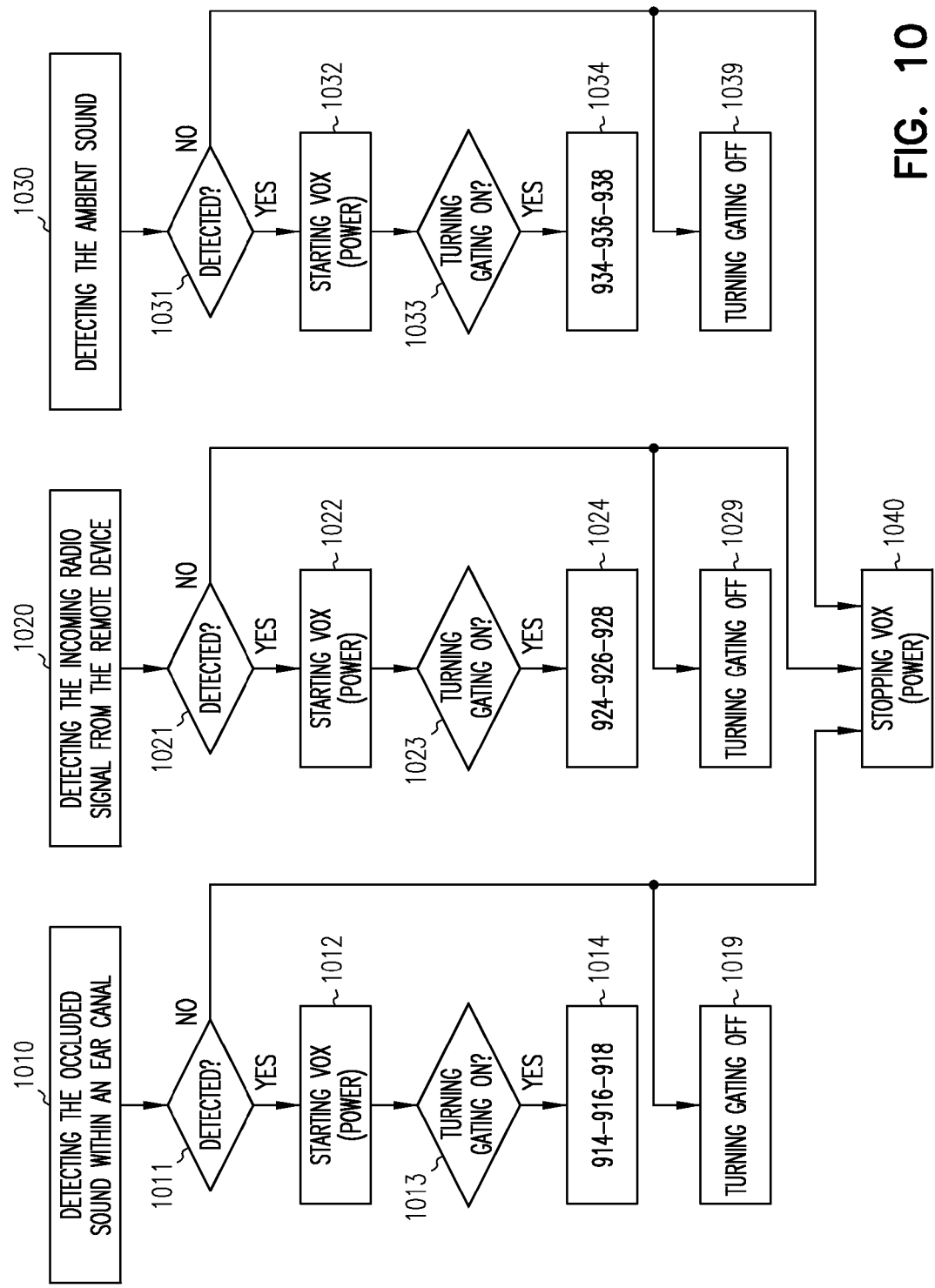
FIG. 10 is a flow chart illustrating another embodiment of the method for audio communication between the single ear-level device and a remote device.

FIG. 10 is a flow chart illustrating another embodiment of the method for audio communication using system 100. In this embodiment, in addition to power management, the VOX is also used for gating, i.e., blanking or attenuating, sounds. The VOX circuit includes a power switch connecting a battery to the portions of the circuit of system 100 that are voice activated and gating modules capable of blanking or attenuating the occluded sound, the remote sound, and the ambient sound. Examples of such gating modules include occluded sound gating module 441, remote sound gating module 451, and ambient sound gating module 421, designated for the occluded sound, the remote sound, and the ambient sound, respectively.

Steps 1010-1019 illustrate the process of detecting the occluded sound from the ear canal and transmitting it to the remote device. The microphone disposed in the ear canal detects the occluded sound within the ear canal at 1010. If the occluded sound is detected at 1011, the VOX of the system is started to power the voice-activated portions of the circuit of system 100 at 1012 if they are not already powered. The VOX determines whether to start gating the occluded sound on at 1013. In one embodiment, the occluded sound is gated on when its amplitude exceeds a predetermined threshold and when the effective gating coordination rule permits. Examples of gating coordination rules are described above with respect to FIG. 4B. If the occluded sound is gated on at 1013, it is processed at 1014 by following steps that are identical or similar to steps 914-916-918. The occluded sound is gated off at 1019 if it has been gated on but is no longer detected. In one embodiment, the occluded sound is gated off after it is not detected for a predetermined period.

Steps 1020-1028 illustrate the process of detecting the remote sound sent from the remote device and transmitting it to the ear canal. A radio receiver detects the incoming radio signal representing the remote sound from the remote device at 1020. If the remote sound is detected at 1021, the VOX of the system is started to power the voice-activated portions of the circuit of system 100 at 1022 if they are not already powered. The VOX determines whether to start gating the remote sound on at 1023. In one embodiment, the remote sound is gated on when its amplitude exceeds a predetermined threshold and when the effective gating coordination rule permits. In another embodiment, the remote sound is gated on when the incoming radio signal is detected and when the effective gating coordination rules permits. If the remote sound is gated on at 1023, it is processed at 1024 by following steps that are identical or similar to steps 924-926-928. The remote sound is gated off at 1029 if it has been gated on but is no longer detected. In one embodiment, the remote sound is gated off after it is not detected for a predetermined period.

Steps 1030-1038 illustrate the process of detecting the ambient sound and transmit it to the ear canal. A microphone outside the ear canal detects the ambient sound at 1030. If the ambient sound is detected at 1031, the VOX of the system is started to power the voice-activated portions of the circuit of system 100 at 1032 if they are not already powered. The VOX determines whether to start gating the ambient sound on at 1033. In one embodiment, the ambient sound is gated on when its amplitude exceeds a predetermined threshold and when the effective gating coordination rule permits. If the ambient sound is gated on at 1033, it is processed at 1034 by following steps that are identical or similar to steps 934-936-938. The ambient sound is gated off at 1039 if it has been gated on but is no longer detected. In one embodiment, the ambient sound is gated off after it is not detected for a predetermined period.

If no signal (sound or radio signal) is detected at 1011, 1021, and 1031, the VOX is stopped at 1040. In other words, if no sound is to be processed, the communication system is inactivated except for the portions that must be active for sound detection at all times. In one embodiment, the VOX is stopped after a predetermined period of time to avoid frequent activation/deactivation during a conversation.

It is to be understood that the above detailed description is intended to be illustrative, and not restrictive. Other embodiments will be apparent to those of skill in the art upon reading and understanding the above description. For example, two ear-level devices 110, or a pair of devices each being similar to ear-level device 110, can be used to deliver a stereo sound. The scope of the invention should, therefore, be determined with reference to the appended claims, along with the full scope of equivalents to which such claims are entitled.

What is claimed is:

1. A communication system configured to transmit sounds to and from an ear having an ear canal, the system comprising:
   an ear-level communication device configured to be worn in or about the ear, the ear-level communication device including:
     an ear canal microphone configured to detect a local sound from about the ear canal when being placed in the ear canal;
     the external microphone configured to detect an ambient sound from outside the ear canal an ear canal speaker configured to transmit a processed remote sound and a processed ambient sound to the ear canal;
     an external microphone configured to detect an ambient sound from outside the ear canal;
     a processor coupled to the ear canal microphone, the ear canal speaker, and the external microphone, the processor configured to process the local sound, the remote sound, and the ambient sound;
     a transceiver coupled to the processor, the transceiver configured to transmit a first wireless signal representing the local sound and detect a second wireless signal representing the remote sound; and
     a voice operated exchange (VOX) circuit coupled to the processor, the VOX circuit configured to activate voice-activated portions of the system in response to detection of the local sound and in response to detection of the remote sound and configured to gate each of the local sound, the remote sound, and the ambient sound according to programmed gating coordination rules based on whether the local sound is detected and whether the second wireless signal is detected in response to the detection of the local sound and in response to the detection of the remote sound.

2. The system of claim 1, wherein the ear-level communication device comprises an earmold housing the ear canal microphone, the ear canal speaker, the processor, the transceiver, and the VOX circuit, the earmold configured for use as an in-the-ear (ITE) device.

3. The system of claim 1, wherein the VOX circuit is configured to gate the local and the remote sound according to programmed gating coordination rules.

4. The system of claim 1, wherein the VOX circuit is configured to deactivate the voice-activated portions of the system if none of the local sound, the remote sound, and the ambient sound is detected for a predetermined period of time.

5. The system of claim 1, wherein the ear-level communication device comprises a hearing aid including the ear canal microphone, the ear canal speaker, the external microphone, the processor, the wireless transceiver, and the VOX circuit, the hearing aid configured for use as an in-the-ear (ITE) device.

6. The system of claim 5, wherein the hearing aid is configured for use as an in-the-canal (ITC) device.

7. The system of claim 6, wherein the hearing aid is configured for use as a completely-in-the-canal (CIC) device.

8. The system of claim 1, wherein the ear-level communication device comprises a hearing aid including the ear canal microphone, the ear canal speaker, the external microphone, the processor, the wireless transceiver, and the VOX circuit, the hearing aid configured for use as a behind-the-ear (BTE) device.

9. The system of claim 1, wherein the VOX circuit comprises:
- a local sound gating module configured to blank or substantially attenuate the local sound;
- a remote sound gating module configured to blank or substantially attenuate the remote sound;
- an ambient sound gating module configured to blank or substantially attenuate the ambient sound; and
- a controller configured to coordinate the local sound gating module, the remote sound gating module, and the ambient sound gating module according to the programmed gating coordination rules.

10. The system of claim 9, wherein the controller is configured to coordinate the local sound gating module, the remote sound gating module, and the ambient sound gating module such that the local sound is gated off, the remote sound is gated on, and the ambient sound is gated off when the second wireless signal is detected while the local sound is not detected.

11. The system of claim 9, wherein the controller is configured to coordinate the local sound gating module, the remote sound gating module, and the ambient sound gating module such that the local sound is gated off, the remote sound is gated on, and the ambient sound is gated on when the second wireless signal is detected while the local sound is not detected.

12. The system of claim 9, wherein the controller is configured to coordinate the local sound gating module, the remote sound gating module, and the ambient sound gating module such that the local sound is gated on, the remote is gated sound off, and the ambient sound is gated off when the local sound is detected while the second wireless signal is not detected.

13. The system of claim 1, wherein the VOX circuit is configured to attenuate each of the local sound, the remote sound, and the ambient sound according to programmed gating coordination rules.

14. A method, comprising:
- detecting a local sound from about an ear canal of an ear using an ear canal microphone of an ear-level communication device worn in or about the ear, the ear canal microphone placed in the ear canal;
- transmitting the detected local sound as an outgoing wireless signal from the ear-level communication device to a remote device;
- detecting a remote sound represented by an incoming wireless signal transmitted from the remote device to the ear-level communication device;
- transmitting the remote sound to the ear canal using an ear canal speaker of the ear-level communication device;
- detecting an ambient sound from outside the ear canal using an external microphone;
- transmitting the ambient sound to the ear canal using the ear canal speaker;
- starting a voice operated exchange (VOX) in the ear-level communication device in response to detection of the local sound and in response to detection of the remote sound;
- gating each of the local sound the remote sound, and the ambient sound on or off using a VOX circuit of the ear-level communication device based on whether the local sound is detected and whether the remote sound is detected in response to the VOX being started; and
- stopping the VOX if none of the local sound and the remote sound is detected for a predetermined period of time.

15. The method of claim 14, further comprising gating the local sound and the remote sound to prevent the remote sound from being detected by the ear canal microphone and transmitted to the remote device.

16. The method of claim 14, further comprising gating the local sound off, gating the remote sound on, and gating the ambient sound off, when the remote sound is detected while the local sound is not detected.

17. The method of claim 14, further comprising gating the local sound off, gating the remote sound on, and gating the ambient sound on, when the remote sound is detected while the local sound is not detected.

18. The method of claim 14, further comprising gating the local sound on, gating the remote sound off, and gating the ambient sound off, when the local sound is detected while the remote sound is not detected.

19. The method of claim 14, comprising receiving the incoming wireless signal from at least one of a computer, a personal digital assistant (PDA), a cellular phone, a walkie talkie, or a language translator.

20. The method of claim 14, wherein gating each of the local sound, the remote sound, and the ambient sound off comprises attenuating the each of the local sound, the remote sound, and the ambient sound.

* * * * *